July 7, 1925.  
G. A. THEOBALD  
MOLDING MACHINE  
Filed Jan. 3, 1922

Inventor:  
G. A. Theobald  
by Wright Brown Quinby Mey  
Attys.

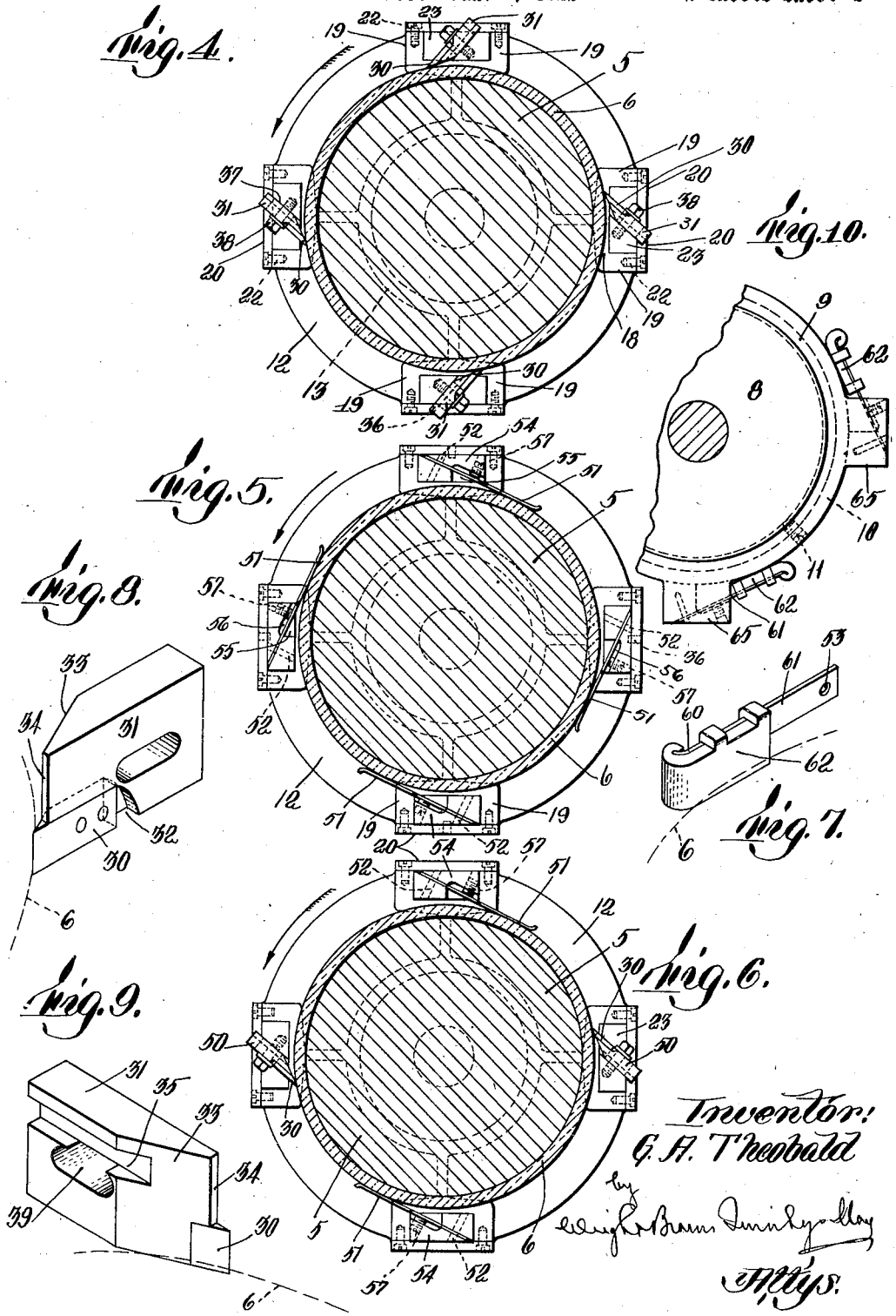

Patented July 7, 1925.

1,544,783

UNITED STATES PATENT OFFICE.

GEORGE A. THEOBALD, OF BOSTON, MASSACHUSETTS, ASSIGNOR, BY MESNE ASSIGNMENTS, TO A. H. HEWS & CO., INCORPORATED, OF CAMBRIDGE, MASSACHUSETTS, A CORPORATION OF MASSACHUSETTS.

MOLDING MACHINE.

Application filed January 3, 1922. Serial No. 526,479.

*To all whom it may concern:*

Be it known that I, GEORGE A. THEOBALD, a citizen of the United States, residing at Boston, in the county of Suffolk and State of Massachusetts, have invented new and useful Improvements in Molding Machines, of which the following is a specification.

This invention relates to machines for molding and forming articles of plastic, or moldable material, such, for example, as earthen-ware flower pots and other articles of general cylindrical or frustro-conical shape.

Heretofore it has been the practice to place the plastic material in a mold of the proper shape to form the outside of the article and then to introduce into the mold a plunger of proper shape to form the inside of the article, whereby the plastic material is formed into the desired shape. This plunger has also been provided with a member fitting between the plunger and the upper edge of the mold for forming or shaping the top or upper end of the molded article. In practical operation it is found that the plastic material is squeezed out between the top forming member and the mold, forming fins or ribs on the molded article which if they have not earlier been removed must be chipped off after the article is baked or otherwise set or hardened.

It has been proposed to remove the fin or rib by means of knives carried by the plunger, the plunger rotating relative to the mold during the forming operation whereby the knives cut away the excess plastic material escaping between the mold and the top forming member. In practice it is found that such knives are subjected to rapid wear and frequent replacement is necessary. One feature of this invention, therefore, relates to a construction and mounting for the knives whereby renewal is facilitated and whereby the wastage in stock of which the knives are made is reduced to as small an amount as possible.

A further and important feature, however, resides in the provision of wipers which may be used either in conjunction with the knives or even in place thereof, these wipers being so constructed that wear is much less than is the case with knives.

For a more complete understanding of this invention together with further features and advantageous details and combinations of parts, reference may be had to the accompanying drawings in which—

Figure 4 is a section on line 4—4 of Figure 2.

Figure 5 is a view similar to Figure 4 except that wipers are shown in place of knives.

Figure 6 is a similar view showing the use of both knives and wipers.

Figure 7 is a perspective of one form of wiper.

Figures 8 and 9 are perspectives showing opposite sides of a knife and its holder.

Figure 10 is a partial section on line 10—10 of Figure 2, but showing wipers of the form shown in Figure 7 in place of knives.

Figure 1:
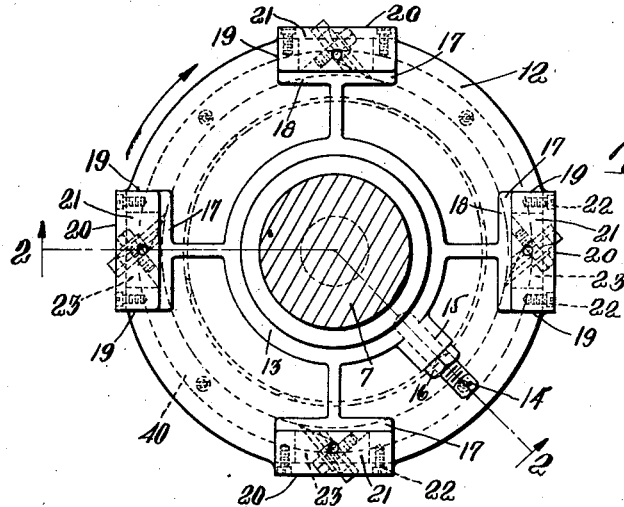
Figure 1 is a plan of a mold and plunger assembled, the shank of the plunger being shown in section.
Figure 2:
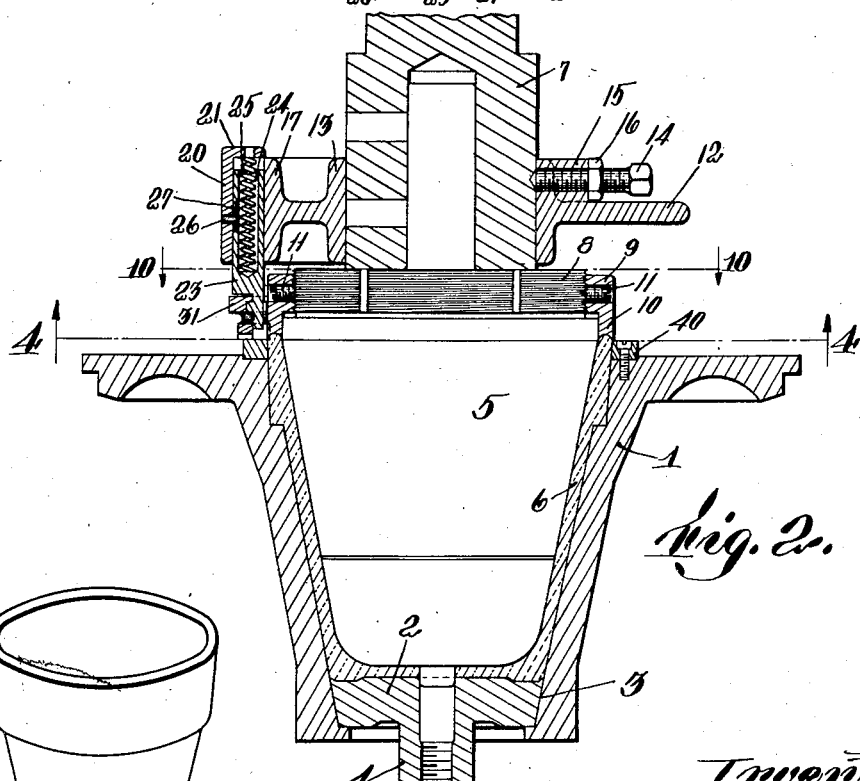
Figure 2 is a section on line 2—2 of Figure 1.
Figure 3:
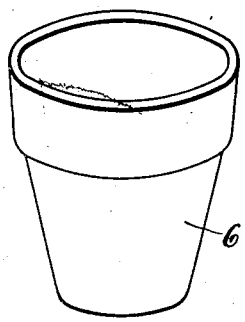
Figure 3 is a perspective of the article to be made.

Referring first to Figures 1 and 2 at 1 is shown a mold having an internal surface of substantially frustro-conical shape corresponding with the outer face of the molded article shown in Figure 3. The smaller end of the mold is perforated for the reception of a base member 2 formed at its top to correspond with the configuration desired for the outside of the base of the article and formed at its outer edges to seat within a portion 3 of the mold. The base member 2 has a depending boss 4 to which may be made fast the end of a suitable rod (not shown) by which the base member may be pushed upwardly within the mold to free the article therefrom after it has been molded.

To form the inside of the article a plunger 5 is shown which may be depressed into the mold to force the plastic material shown at 6 into the desired shape. The plunger is preferably caused to rotate as it is pushed into the mold, this action facilitating the flow of the plastic material into position and also serving to actuate the fin or rib-removing mechanism to be described. The plunger 5 has a shank portion 7 provided with an enlarged threaded portion 8. Screwed on this portion 8 is a collar 9 having a depending marginal flange member 10, the edge of which is formed according to the desired configuration of the top or upper end of the article. By turning the collar 9 the heighth of the top-forming edge thereof may be adjusted relative to the plunger to give the desired configuration to the article. This collar may be fixed in adjusted position by means of set screws 11 so that it rotates with the plunger 5.

Positioned above the portion 8 the shank 7 carries a support consisting of a disk 12 having a central perforated boss 13 through which the shank passes, and which is adjustably fixed thereon by means of a set screw or bolt 14 threaded through a boss 15 projecting from the disk and the boss 13. A lock nut 16 may be used to prevent accidental loosening of this set screw. The disk 12 has spaced adjacent its outer edge a series of substantially rectangular shaped socket members 17. These socket members have walls 18 extending substantially parallel to the axis of the plunger and at right angles to diametrical lines in the disk 12. Extending outwardly from the walls 18 are spaced walls 19 these walls forming three sides of these socket members. The fourth side of each member is formed by a plate 20 having at its upper end an inwardly directed flange 21 overlapping the end of the walls 18. This plate 20 may be made fast to the ends of the walls 19 by screws 22. Slidable within these sockets are bars or rods 23, each bar being recessed from its upper end downwardly, as shown at 24 in Figure 2, for the reception of a coil spring 25 bearing against the base of the recess at one end and against the under side of the flange 21 at the other end. By this means the bars 23 are normally urged downwardly toward the mold 1 in the position shown in Figure 2, but may be pushed upwardly against the pressure of these springs. The motion permitted each of these bars is limited, as shown in Figure 2, by a pin 26 extending through the plate 20 and projecting into a notch 27 in the outer face of the bar. As shown in Figure 1, four of these bars are employed but the number might be greater or less as desired.

Each bar 23 is designed to carry the mechanism for removing the plastic material, which in the operation of the device, is squeezed out between the top of the mold and the top forming member comprising the flange 10. In Figures 1 and 4 these means are knives, each knife as shown in Figures 8 and 9 comprising a blade member 30 riveted to a knife block 31 preferably within a recess 32 therein. Each knife block is beveled at 33, the end of this beveled portion being cut away at 34 for the purpose of affording clearance for the blade and permitting considerable grinding thereof to take place before the blade must be renewed.

Each block 33 has a groove as 35 in its rear face within which fits a tongue 36 projecting from a beveled face 37 at the lower end of each bar 23. This face 37 is cut at an angle to the radial to the axis of the plunger so that the blade on the knife block points diagonally toward the flange 10. When knives are employed this face is sloped to point the knife in the direction of rotary motion of the plunger. The knife block is held in position by means of a bolt 38 passing through a slot 39 therein and threaded into the lower end of the bar 23. By this means the relative position of the knives with relation to the top forming member 10 may be adjusted to take up wear and shortening of the knife due to sharpening. It will be noted that in this construction each knife is independently resiliently mounted to yield away from the mold parallel to the axis of the plunger, that each knife block is independently adjustable toward and from the work, and that the blades, which must be formed of high grade material, are so carried that they are readily renewable and that there is little metal to be wasted when the blades are so worn as to require replacement. Above the edge of the mold is a ring 40, as shown in Figure 2, against which the lower edges of the knives bear as urged by the springs 25. It is therefore evident that as the plunger rotates the material squeezed out between the mold and the top forming member 10 passes out over the ring 40 where it is cut away by the knives as fast as it is extruded.

In Figure 6 is shown a modified construction in which a pair of knives are shown at 50 mounted substantially in the manner above described and between these knives are positioned wipers indicated at 51. These wipers, as shown in this figure, comprise strips of spring metal which are made fast by any suitable means to the lower inclined faces of the corresponding bars 23, it being noted, however, that the inclination of these faces is reversed relative to the direction of rotation of the plunger so that the wipers trail along on the outside of the top-forming member 10 on the line of extrusion of the plastic material instead of facing inwardly theretoward as is the case with the knives. These wipers being of spring material it is unnecessary to provide for adjusting them along the faces of the bars 23.

The wipers may be attached, if desired, by fixing a pin 52 in the lower portion of each bar 23 and forming a corresponding perforation 53, as shown in Figure 7, in the wiper to fit thereover. A block 54 having its inner face reversely inclined to the supporting face of the bar 23 may then be laid over the wiper, the bar and block being cut away at 55 and 56, respectively, to permit a more resilient action of the wiper. The wipers may be held into close engagement with the top forming member 10 by means of a screw 57 passing through the block 54 and bearing at its inner end against the outer face of the wiper. If desired the block 54 may be integral with the bar 23, a slot being cut therebetween upwardly from the lower end of the bar to provide for positioning the wiper. In place of alternate wipers and knives as shown in Figure 6, wipers alone may be employed as shown in Figure 5.

In Figure 7 is shown a preferred form of wiper comprising a resilient bar or finger 61 having its free outer end 60 covered with a soft pad 62 which bears against the outer face of the top form member 10. This portion 62 is preferably of soft rubber which is found to admirably answer the purpose. On the whole it is deemed preferable to employ the wipers, with or without the knives, it being found there is much less wear on the wipers particularly when they are formed as shown in Figure 7 with a covering of soft rubber on their active portions.

In Figure 10 is shown a fragmentary section wherein wipers of the type shown in Figure 7 are used throughout, in place of knives, but wherein, instead of mounting the wipers at the lower ends of resilient bars as 23 of Figure 2, they are carried directly by slotted lugs 65 extending outwardly from the top forming member carrying ring 9.

Having thus described certain embodiments of this invention it should be evident to those skilled in the art that many changes and modifications might be made therein without departing from its spirit or scope as defined by the appended claims.

I claim:

1. A device of the class described comprising a mold, a plunger movable into and out of said mold, a top forming member movable with said plunger, and a plurality of knives and wiper elements actuable to remove plastic material squeezed out between said mold and top-forming member.

2. A device of the class described comprising a mold, a plunger movable into and out of said mold, a top-forming member movable with said plunger, and a wiper member of yielding material actuable to remove plastic material squeezed out between said mold and top-forming member.

3. A device of the class described comprising a mold, a rotary plunger movable axially into and out of said mold, a top-forming member movable with said plunger, a support carried by said plunger, a plurality of bars yieldingly slidable in said support, and an element carried by each bar and adapted to remove plastic material squeezed out between said mold and top-forming member as said plunger is rotated.

4. A device of the class described comprising a mold, a rotary plunger movable axially into and out of said mold, a top-forming member movable with said plunger, a support carried by said plunger, a plurality of bars yieldingly slidable in said support, a block adjustably carried at one end of certain of said bars, and a knife blade fixed to each block and adapted to remove plastic material squeezed out between said mold and top-forming member as said plunger is rotated.

5. A device of the class described comprising a mold, a rotary plunger movable axially into and out of said mold, a top-forming member movable with said plunger, a support carried by said plunger, a bar yieldingly slidable in said support substantially parallel to the axis of said plunger, said bar having a face inclined to the radial from said axis, a block adjustable along said face toward and from said axis, and a knife blade fixed to said block.

6. A device of the class described comprising a mold, a rotary plunger movable axially into and out of said mold, a top-forming member movable with said plunger, a support carried by said plunger, a bar yieldingly slidable in said support substantially parallel to the axis of said plunger, said bar having a face inclined to the radial from said axis, and an element carried on said face and actuable on the rotation of said plunger to remove material squeezed out between said mold and top-forming member.

7. In a device of the class described, a wiper for removing extrusions of plastic material, said wiper being formed of yieldable material.

8. In a device of the class described, a wiper for removing extrusions of plastic material, said wiper being formed of soft rubber.

9. In a device of the class described, a wiper comprising a strip of resilient material and a covering of rubber therefor.

10. In a device of the class described, a wiper comprising a strip of resilient material and a covering of soft resilient material therefor.

11. In a device of the class described, a wiper comprising a strip of resilient material adapted to be fixed at one end, and a covering of soft rubber on its opposite end.

12. In a device of the class described, a mold, a plunger for forming plastic material in said mold and movable into and out of said mold, and means for removing excess material extruded from said mold by said plunger comprising resilient fingers arranged to be drawn over the line of extrusion.

In testimony whereof I have affixed my signature.

GEORGE A. THEOBALD.